KENNETH TRICKETT AND
THOMAS LESLIE FORSYTH,
INVENTORS

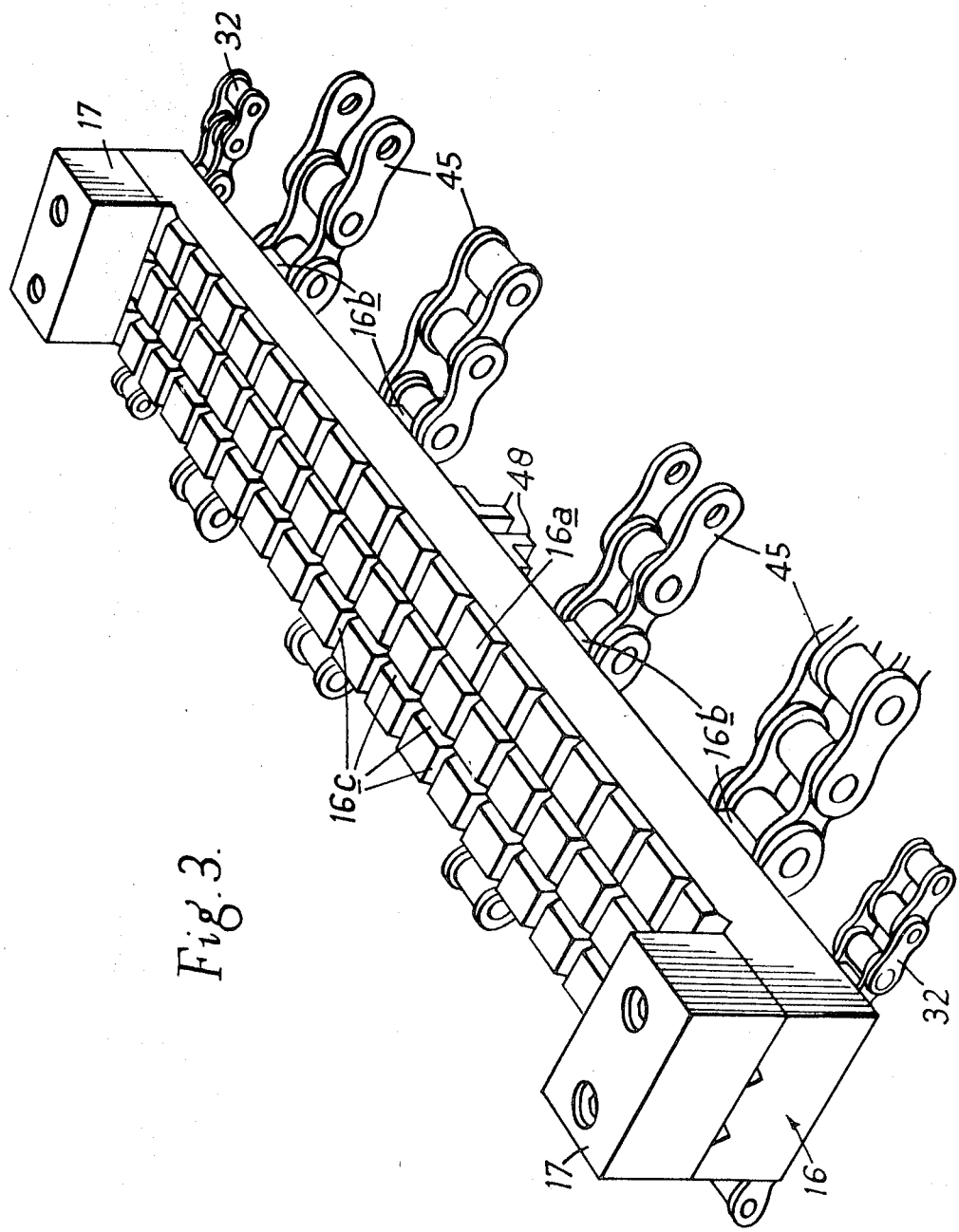

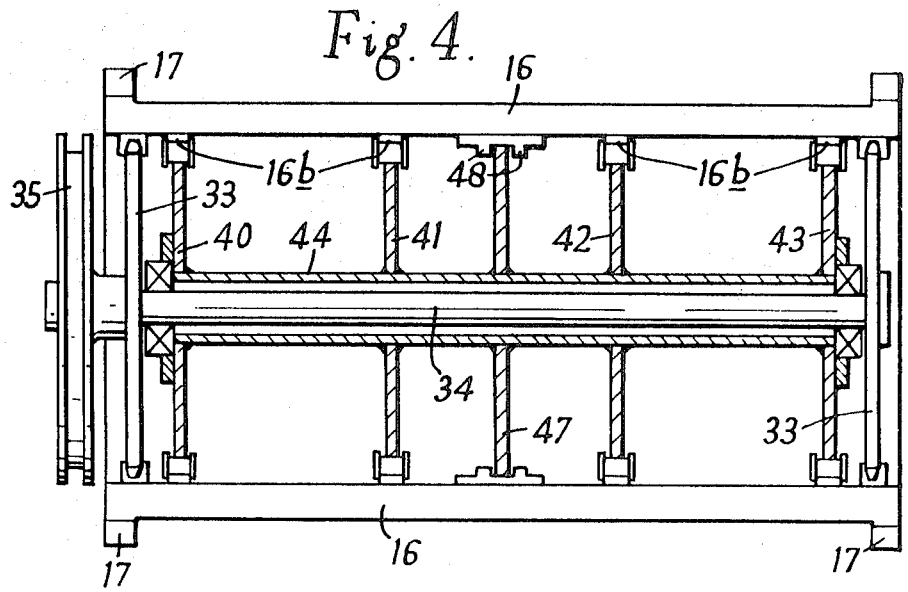
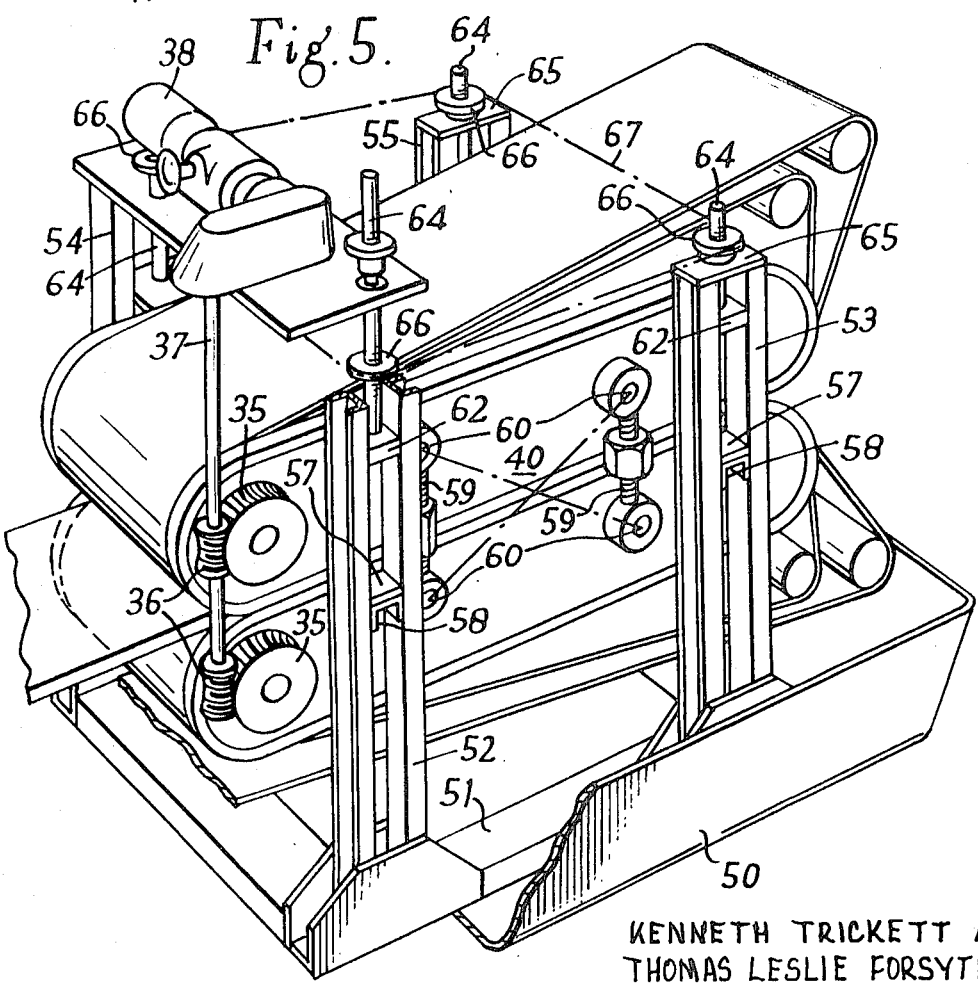

United States Patent Office 3,600,274
Patented Aug. 17, 1971

3,600,274
MOULDING DEVICE FOR A SLURRY WHEREIN THE FORMING MEANS INCLUDES OPPOSED SHOES ATTACHED TO OPPOSED ENDLESS CHAINS
Kenneth Trickett, Egham, and Thomas Leslie Forsyth, Cleadon, near Sunderland, England, assignors to Newalls Insulation & Chemical Company Limited, Washington, England
Filed Feb. 12, 1968, Ser. No. 704,899
Claims priority, application Great Britain, Feb. 24, 1967, 9,058/67
Int. Cl. D21j 3/12
U.S. Cl. 162—303       11 Claims

ABSTRACT OF THE DISCLOSURE

A machine for continuously filtering a slurry and continuously moulding the solid matter retained from the slurry which comprises two endless belt systems providing a run along which shoes attached end to end along to each of the chains engage one another to define a forming zone which is rigid-walled and of constant cross-section. A nozzle that is sealed with respect to the forming zone functions to discharge slurry between the engaged shoes. Each shoe is provided with passage grooves on the formation-zone side thereof to permit the escape of liquid from the slurry in the forming zone. Layers of filtering material such as endless filter belts extend through the formation zone in overlying relationship to the grooves of each shoe.

---

This invention relates to apparatus for filtering and moulding solid matter from a slurry and is more particularly concerned with providing apparatus enabling the filtering and moulding of the slurry to proceed continuously.

According to this invention there is provided apparatus for filtering and moulding solid matter from a slurry, comprising first and second endless forming means each of which comprises endless chains and a set of rigid shoes mounted end to end along the full length of the chains, the two forming means having a run along which the shoes of said two forming means engage one another and together define a forming zone which is rigid-walled and of constant cross-section, each shoe having a passage means extending therethrough and opening to the forming zone side thereof, one or more slurry inlet nozzles opening to one end of said forming zone and being sealed with respect to said forming means against the escape of solid matter from said one end of said forming zone, each of said forming means incorporating a layer of a filtering material on the shoes thereof which layer permits the escape of liquid in the slurry from said forming zone but prevents the escape of solid matter of the slurry, and means for driving said first and second forming means at the same speed such that said first and second forming means travel in the same direction as said slurry entering the forming zone.

Figure 1:
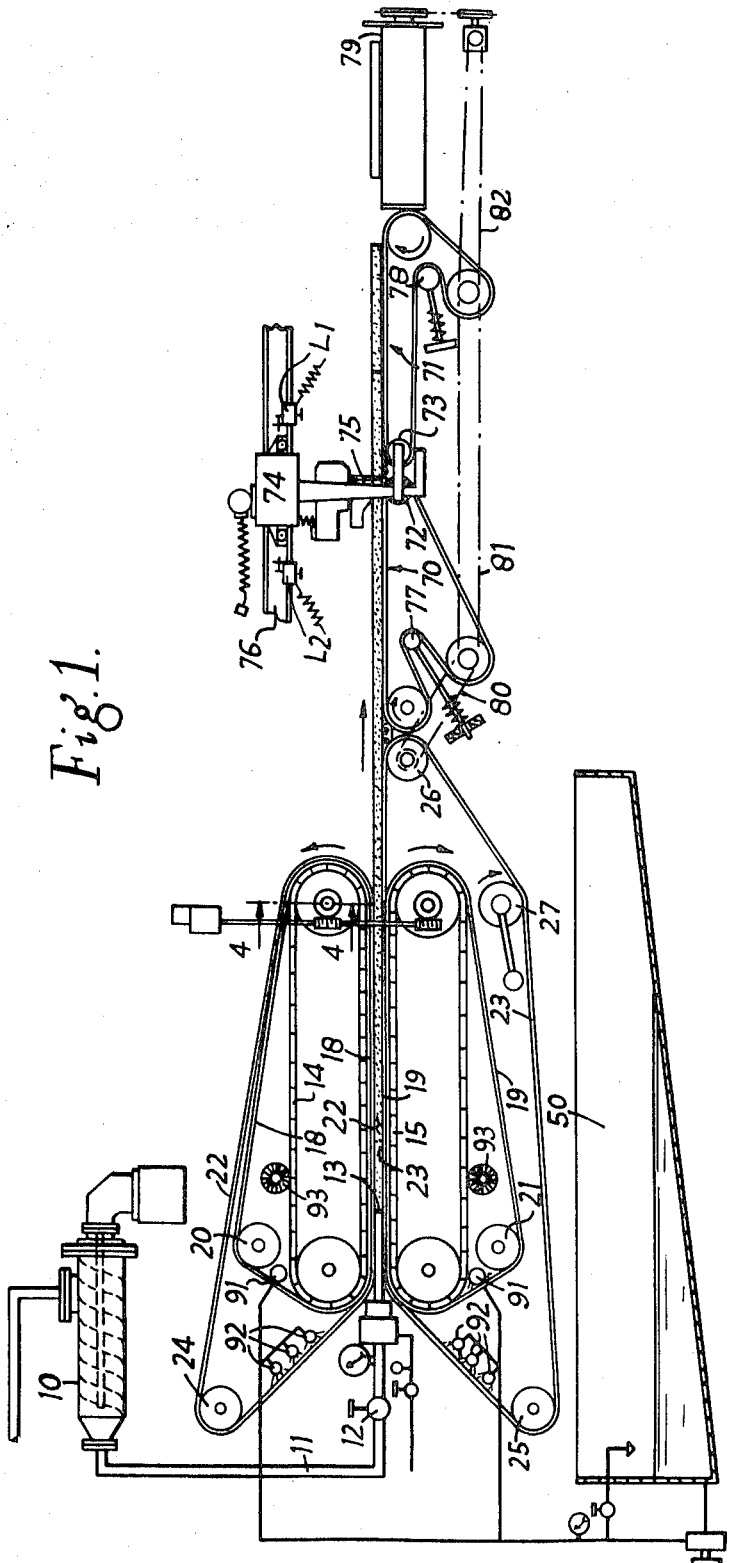
Figure 2:
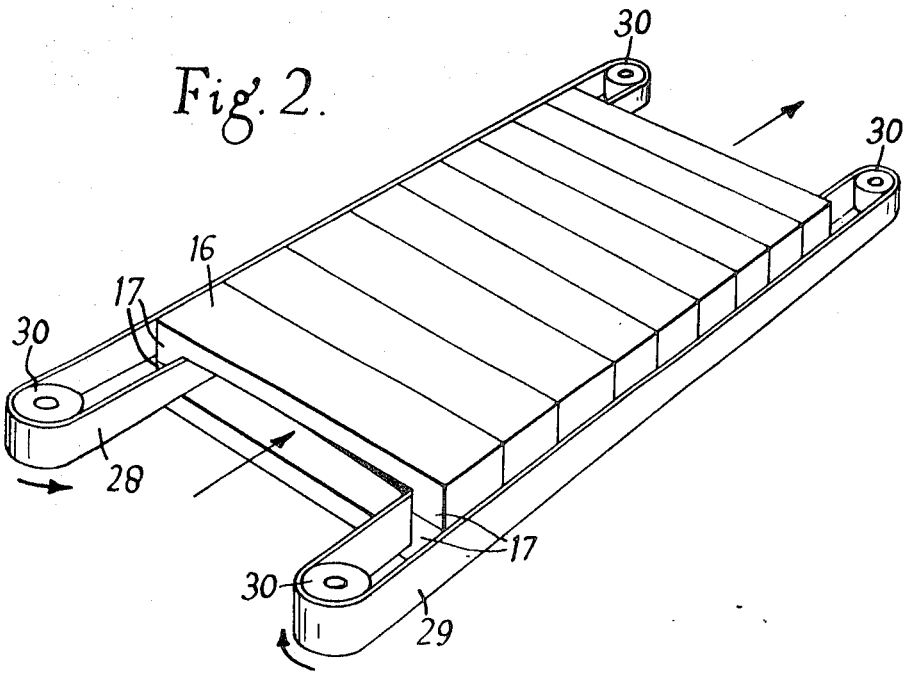
Figure 6:
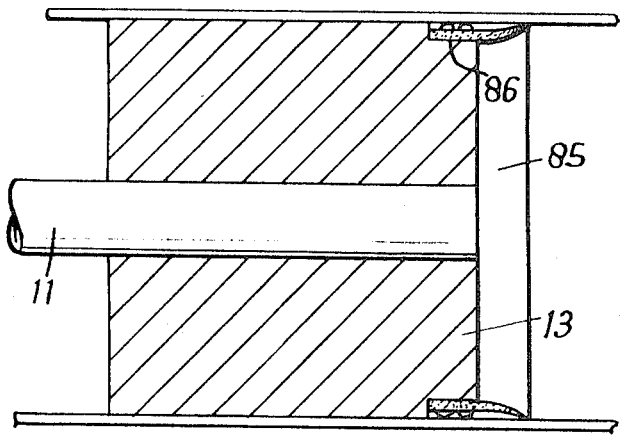

One embodiment of the invention will now be described, by way of example, with reference to the accompanying diagrammatic drawings, in which:

FIG. 1 is a side elevation of the apparatus,

FIG. 2 is a perspective view of the sealing forming means and the shoes on the forming means, FIG. 3 is a perspective view showing one form of shoe and illustrates part of the drive and mounting of the shoes, FIG. 4 is a cross-sectional view on the line 4—4 of FIG. 1, FIG. 5 is a perspective view on the mounting arrangement for the belt systems, and FIG. 6 shows one form of seal for the slurry nozzle.

The arrangement illustrated in the drawings is designed continuously to filter water out of a slurry and to mould the resulting solid moist matter into a rectangular-section board-like form.

Referring to FIGS. 1 and 2, the slurry is pumped under pressure by a pump 10 along a pipe 11 and through a valve 12 in the pipe to a nozzle 13, the outlet end portion of which is of the same shape as but slightly smaller than the cross-section of the moulded board. The slurry is filtered and moulded in a rectangular-section forming tube which is defined between two moving endless forming means 14, 15. Each belt comprises a number of relatively short rectangular shoes 16 arranged end-to-end on endless chains, each shoe having upstanding flange portions 17 at its side edges so that the shoes of each forming means form a wide shallow channel extending along the length of the forming means. The two forming means are disposed one above the other, and along a horizontal run the upstanding edge portions 17 of the shoes on the upper forming means engage those on the lower forming means to form the rectangular-section forming zone. The slurry nozzle 13 extends into one end of this zone, and the forming means 14, 15 are driven in opposite directions to each other such that the shoes which at any instant define the forming zone move in the same direction as slurry entering the zone thorugh the nozzle.

Referring to FIG. 3, one face of each of the shoes 16 is formed with a pattern of intersecting grooves 16c which extend lengthwise of the forming means and transversely to the forming means, the latter grooves extending under the upstanding side portions 17 and opening to the side edges of the shoes to assist the escape of the filtrate. Upper and lower woven wire belts 18, 19 having a width corresponding to that of the base of the channel in each shoe 16 extend through the forming zone against the bases of the channels and round respective guide rollers 20, 21. Two further belts 22, 23 which are made of filter cloth and which are of the same width as belts 18, 19 extend through the forming zone and overlie the wire belts, the two wire belts being disposed between the respective filter belts and the shoes of the forming means 14, 15. Outside the forming zone, belt 22 extends round a guide roller 24, and belt 23 extends round guide rollers 25, 26 and a tensioning pulley 27. As shown in FIG. 1, the lower filter belt 23 extends well beyond the downstream end of the lower forming means 15 so as to provide a support for the moulded board emerging from the zone. The wire and filter belts are driven by frictional engagement with the shoes on the forming means 14, 15.

In order to seal the joints between the abutting faces of the side portions of the shoes along the forming zone, a pair of sealing belts 28, 29 made from a synthetic rubber composition are provided (see FIG. 2) which extend through the zone and rest one against each narrow side face of the zone, the width of the sealing belts being equal to or slightly greater than the thickness of the board. These sealing belts are carried by rollers 30 rotating about vertical axes and disposed just beyond the ends of the forming zones and are driven by frictional engagement with the main forming means 14, 15. The return runs of the sealing belts extend outside the side edges of the shoes 16 but out of contact therewith.

The shoes 16 of each of the forming means 14, 15 are interconnected by drive chains 32 to the links of which the shoes are secured. These drive chains are disposed adjacent the side edges of the shoes 16 and extend round sprockets 33 (see FIGS. 3 and 4). At the end of each of the forming means 14, 15 further from the nozzle 13 the two sprockets 33 carrying the chains are secured on a shaft 34 which also carries a worm-wheel 35. The two worm-wheels 35 are respectively driven by a pair of worm-gears 36 (FIGS. 4 and 5) mounted on a vertical shaft 37 which is supported in the fixed frame of the apparatus and which is driven by an electric motor 38 through a variable ratio gear box or other variable ratio coupling. The worm-gears and worm-wheels for each forming means are of opposite hand to those for the other forming means so that the worm-wheels, and hence the forming means are driven in opposite directions to each other.

Between the two drive chains the shoes of each forming means 14, 15 are carried on four rigid bearing plates 40 to 43 which extend in a vertical plane and lengthwise of the main conveyors, the outer edges of these plates defining the path of movement of the shoes 16. The four bearing plates are welded to four transverse tubes 44 which extend through apertures in the plates. Shafts 34 extend through the two endmost tubes. The rear surface of each shoe is formed with respective ribs 16b opposite the four bearing plates and four endless chains 45 extend along the four bearing plates respectively of each of the forming means 14, 15. The arrangement is such that the rollers of each chain are in rolling engagement with the edge of the associated bearing plate and with the ribs 16b opposite this bearing plate. Thus the shoes are supported against the forces exerted on them by the pressure of the slurry entering the forming zone through the nozzle 13 and tending to push the shoes apart. A central guide plate 47 of similar shape to the bearing plates is disposed between plates 41 and 42 and is welded to the tubes 44. and each shoe 16 has a pair of pads 48 which engage opposite faces of the guide plate adjacent its edge so as to prevent lateral movement of the shoes.

A sump 50 for the collection of the filtrate extends below the two forming means 14, 15, and a main frame for supporting the belts stands in the sump. The main frame (see FIG. 5) comprises a base structure 51 resting on the bottom of the sump to which structure are secured four vertical fabricated pillars 52 to 55 each of which provides a vertical guide slot extending along its length. The two bearing plates 40, 43 of the lower forming means 15 each have welded to them a pair of lugs 57 which project outwardly into the slots into the adjacent pillars and rest on rigid brackets 58 welded to the pillars and extending across the slots. The upper and lower forming means 14, 15 are held from relative movement in a vertical direction by pairs of turnbuckles 59 which are fastened on opposite ends of rigid bars 60 extending through the two middle tubes 44 which locate the bearing plates. If desired, diagonally extending turnbuckles may also be provided between the bars 60 (as indicated in chain lines in FIG. 5) to hold the conveyors against longitudinal movement relative to each other.

The bearing plates 40, 43 of the upper forming means 14 each have two lugs 62 welded to them adjacent their upper edges and these lugs 62 project into the slots in the pillars. A vertical screwed rod 64 is disposed in the upper part of each pillar and the four rods respectively extend freely through apertures in the lugs 62 at their lower ends, these ends of the rods being enlarged to support the lugs and engaging the sides of the slots in such a manner that the rods are prevented from rotating. The upper end portions of the four rods extend through thrust plates 65 secured to the tops of the pillars. Above the thrust plates the rods have sprockets 66 in screw-threaded engagement with them, and an endless chain 67 extends round the four sprockets. One of the sprockets is driven by a reversible motor controlled by a switch. Thus when the turnbuckles 59 have been removed, the motor can be started up to drive the sprockets 66. The sprockets rest against respective thrust bearings on the thrust plates 65 on the pillars so that the four rods are lifted and in turn lift the lugs 62. By this means the upper system of the forming means 14 and belts 18, 22 can be lifted away from the lower system 15, 19, 23. When the motor is reversed the upper system is lowered into position on the lower belt system. Since the lugs 62 only rest on the lower ends of the vertical rods 64, any over-travel of the rods in the downward direction results in the heads of the rods moving below the lifting plate, so that the rods cannot exercise any downward pressure on the lugs 62. The requisite degree of pressure between the forming means 14, 15 is applied by means of the turnbuckles.

The rollers for guiding the woven wire and fabric belts are carried by brackets (not shown) secured to the bearing plates 40, 43 supporting the associated forming means 14, or 15.

At the start of operations, the forming means 14 and 15 are stationary and a sealing plug (not shown) is inserted into the end of the forming zone formed by the forming means 14, 15 at its end remote from the nozzle 13 and is held in position so as not to be ejected by the pressure of the slurry emerging from the nozzle. Then, with the forming means still stationary, valve 12 is opened and slurry is permitted to flow into the forming zone at a predetermined pressure through nozzle 13. The nozzle forms a seal with the fabric filter belts and the sealing belts. Liquids in the slurry are forced through the filtering fabric belt by the pressure but the solid matter is retained in the forming zone and commences first to build up against the parts of the filter belts nearest the plug and against the plug itself. The pressure of the incoming slurry drives liquids in the forming zone through the filter belt. The filtrate passes through the woven wire belts and runs laterally along the grooves 16c in the shoes under the side members 17 and thence into the sump 50. The wire belts reinforce the filter belts and prevent them from being pressed into the grooves 16c. Separation of the forming means 14, 15 is prevented by the turnbuckles 59. When the build-up of solid matter against the plug has reached a degree such that this accumulated solid matter cannot be ejected by the pressure of the incoming slurry, the plug is removed and movement of the forming means 14, 15 is commenced. The speed of forming means 14, 15 is adjusted to be equal to the rate of build-up of the solid matter at the outlet end of the forming zone. The solid matter emerges at the outlet end of the zone moulded into a rectangular board and is carried beyond the end of the zone on the lower fabric belt 23. Filtrate is abstracted from the sump 50 by a pump 90 and is fed to spray nozzles 91, 92 which force the filtrate outwards through the belts 18, 19, 22, 23 to clean them. In addition, filtrate from the sump may be fed to nozzles which spray the whole of the assembly of forming means, belts and pulleys and their supporting frame to prevent any solid constituent of the slurry from drying and caking on these parts. Rotary brushes 93 sweep the outer surfaces of the shoes and assist in keeping the grooves 16c clean.

From belt 23, the board moves on to a first belt conveyor 70 and thence on to a second belt conveyor 71. A gap is formed between the first and second conveyors and a circular saw 75 is employed to cut the board into lengths, the saw blade being disposed in the gap. For this purpose, pulleys 72, 73 round which the two conveyor belts respectively extend adjacent the gap are mounted in spaced relation to each other on a carriage 74 which also carries the circular saw and which is movable along rails 76 parallel to the two conveyors. When a saw cut is to be made across the widths of the board the carriage is moved along its rails at a speed equal to that of the board, and the circular saw is traversed across the widths of the board. Switches $L_1$ and $L_2$ are mounted on the rails and constitute limit switches for limiting the movement of the carriage. The first and second conveyor belts respectively extend round spring-loaded jockey pulleys 77, 78 which compensate for the variation in the lengths of the upper runs of the conveyor belts with movement of the pulleys 72, 73 on the carriage. The cut lengths of board are transferred on to a transversely moving conveyor belt 79 and are carried to a drying plant, for example a vacuum drying plant, for extracting further moisture from the board.

Conveyor belt 70 is driven by an endless chain 80 from the guide roller 26 of the filter belt, and the second conveyor belt is driven by an endless chain 81 from the first conveyor belt. If desired the transverse belt 79 may be driven by an endless chain drive 82 from the second conveyor belt.

In a simple form, the seal between the nozzle 13 and the belts 22, 23, 28, 29 comprises a lip seal element as shown diagrammatically in FIG. 6. The element is a ring 85 which may be made from PTFE and which is secured by one edge in a rebate 86 extending round the forward edge of the nozzle. The opposite edge of the ring projects forward and outward beyond the nozzle and slides over the surfaces of the passing fabric belts and sealing belts.

In an alternative form of seal (not shown), a sealing ring extends round the periphery of the forward edge of the nozzle 13, and three peripheral grooves extend round the nozzle behind the sealing ring, liquid being supplied to the two forward grooves at a pressure equal to that of the slurry. The pressures on the two sides of the plastic seal are thus substantially balanced so that there is substantially no leakage in either direction past the plastic sealing ring.

In still another form of seal round the nozzle, rollers carried by the nozzle and extending peripherally along the sides of the nozzle are urged by pressure fluid into rolling sealing engagement with the passing belt surfaces. In this arrangement, a roller extends along each side of the nozzle and is housed in a cylindrical groove which is of slightly larger diameter than the roller and which opens to the outer surface of the nozzle. Between the forward face of the nozzle and the cylindrical groove the outer diameter of the nozzle is slightly reduced, and a sealing ring is secured on this reduced diameter portion and is arranged to perform a wiping action on the belt surfaces passing the nozzle. The forward movement of the belt surfaces pushes each roller forward in its groove and this pressure is resisted by pressure fluids supplied from any convenient source to a chamber which is formed inward and forward of each roller and which opens to the roller groove in a position such that the fluid pressure urges the roller in an outward and rearward direction to form a rolling seal.

The shoes of the forming means 14 and 15 may be replaced by shoes having different widths to enable different widths of board to be made. The upstanding side portions 17 can be replaced by side portions having different heights to enable various thicknesses of board to be produced. The belt holes in the side pieces may conveniently be disposed asymmetrically so that when the side members are removed, rotated through 180° and re-secured, the distance between the side members, corresponding to the width of the board, is altered. The difference in size can conveniently be such as to provide a standard English board width in one position of adjustment and a standard metric width in the other position of adjustment.

If desired the side members at opposite edges of the shoes may be of different heights, and it is possible by this means to provide boards in a range of thicknesses without the necessity for a complete set of side members for each individual thickness of board to be made. It will, however, be understood that the filtered slurry may be moulded in a wide variety of shapes by appropriate shaping of the shoes and the filtering and reinforcing belts.

In a modified arrangement of the apparatus, the first and second conveyors 70, 71 are replaced by a single conveyor which has a dip in its top run. The dip is produced by causing the belt to run over a first roller, under a second roller which is disposed at a lower level than the first roller, and thence over a third roller disposed on the same level as the first roller. Between the first and third rollers, a platform is provided which supports the board as it moves across the dip and which forms part of a carriage carrying the rotary saw and the three rollers. The carriage is movable lengthwise of the conveyor as before, and a system of limit switches is provided similar to that shown in the arrangement of FIG. 1 for controlling the movement of the carriage and the travel of the saw across the width of the board. The waste material from the sawing process can be re-made into slurry if desired.

In some constructions the grooves 16c may all be inclined to the direction of travel of the forming means 14, 15.

Means may be provided for controlling the temperature of the slurry on its way to the nozzle 13.

It will be understood that instead of a single nozzle 13, there may be a nozzle box from which a number of nozzles project into the zone, the nozzle box forming a seal with the belts, say in one or other of the ways described above in relation to nozzle 13.

We claim:

1. Apparatus for filtering and molding solid matter from a slurry, comprising first and second endless forming means each of which comprises endless chains and a set of rigid shoes mounted end to end along the full length of the chains, the two forming means having a run along which the shoes of said two forming means engage one another and together define a forming zone which is rigid-walled and of constant cross-section, each shoe having passage means extending therethrough and opening to the forming zone side thereof, one or more slurry inlet nozzles opening to one end of said forming zone and being sealed with respect to said forming means against the escape of solid matter from said one end of said forming zone, each of said forming means incorporating a layer of a filtering material on the shoes thereof which layer permits the escape of liquid in the slurry from said forming zone via said passage means but prevents the escape of solid matter of the slurry, and means for driving said first and second forming means at the same speed such that said first and second forming means travel in the same direction as said slurry entering the forming zone.

2. Apparatus as claimed in claim 1, wherein those surfaces of said shoes on both said forming means which co-operate to define said forming zone are of rectangular shape as viewed along said forming means.

3. Apparatus as claimed in claim 2, wherein a pair of endless sealing belts extend through said forming zone at opposite sides thereof and are driven in synchronism with said first forming means, one of said sealing belts serving to form a seal between the shoes of one of said forming means and the shoes of the other of said forming means at one side of said forming zone, and the other of said sealing belts serving to form a corresponding seal at the opposite side of said forming zone.

4. Apparatus as claimed in claim 3, wherein said sealing belts are driven by frictional engagement with said forming means.

5. Apparatus as claimed in claim 1, wherein fixed backing means is provided in association with said shoes of said first and second forming means along said run for preventing deflection of the shoes of each of said forming means away from those of the other forming means along said run.

6. Apparatus as claimed in claim 5, wherein said fixed backing means comprise respective rigid sub-frames by which said forming means are carried, said sub-frames being mounted in a main frame, and wherein means is provided for moving said sub-frames towards and away from each other for loading the shoes of each of the forming means along said run into engagement with those of the other of the forming means.

7. Apparatus as claimed in claim 1, wherein said layer of filtering material of each forming means is provided in the form of an endless belt made from said material, which belt extends, backed by said shoes of the respective forming means, through said forming zone and is driven in synchronism with said shoes, said shoes providing passage means through which the filtrate passing through said layer of filtering material can escape.

8. Apparatus as claimed in claim 7, werein said passage means comprises a pattern of grooves in a face of each of said shoes, which face bounds said forming zone, said shoes having side portions formed with laterally extending through-passages to which said grooves lead.

9. Apparatus as claimed in claim 7, wherein each of said forming means further comprises a reinforcing endless perforate belt which extends through said forming zone between said belt of filtering material and said shoes and which is driven in synchronism with said first and second forming means.

10. Apparatus as claimed in claim 9, wherein said reinforcing belts are made from wire.

11. Apparatus as claimed in claim 9, wherein said belt of filtering material and said reinforcing belt are driven by frictional engagement with said forming means.

References Cited

UNITED STATES PATENTS

| | | | |
|---|---|---|---|
| 1,933,934 | 11/1933 | Ruby | 162—399XR |
| 2,075,735 | 3/1937 | Loomis | 18—5XR |
| 2,867,843 | 1/1959 | Browne et al. | 162—203 |

S. LEON BASHORE, Primary Examiner

R. H. TUSHIN, Assistant Examiner

U.S. Cl. X.R.

162—203, 214, 225, 399